United States Patent [19]

Joseph

[11] Patent Number: 5,059,106

[45] Date of Patent: Oct. 22, 1991

[54] APPARATUS FOR MOLDING COMPOSITE METAL-ELASTOMERIC WHEELS

[75] Inventor: Jeffrey S. Joseph, Perrysburg, Ohio

[73] Assignee: Motor Wheel Corporation, Lansing, Mich.

[21] Appl. No.: 443,412

[22] Filed: Nov. 30, 1989

[51] Int. Cl.$^5$ .......................... B22C 9/28; B29C 45/37
[52] U.S. Cl. ......................... 425/125; 249/56; 249/91; 249/139; 425/127; 425/577; 425/DIG. 47
[58] Field of Search ...................... 249/56, 91, 95, 139; 425/117, 125, 116, 127, 589, DIG. 47, 577; 264/46.7

[56] References Cited

U.S. PATENT DOCUMENTS

| | | | |
|---|---|---|---|
| 207,645 | 9/1878 | Crane | 249/95 |
| 438,875 | 6/1890 | Winding | 249/160 |
| 1,703,082 | 2/1929 | Norton | 249/56 |
| 1,745,891 | 2/1930 | Dimeo | 249/56 |
| 1,834,996 | 12/1931 | Bateman et al. | 249/57 |
| 3,762,677 | 10/1973 | Adams | 249/56 |
| 4,165,131 | 8/1979 | Thompson | 249/56 |
| 4,180,232 | 12/1979 | Hardigg | 249/135 |
| 4,225,109 | 9/1980 | Yotsutsuji et al. | 249/111 |
| 4,251,476 | 2/1981 | Smith | 264/46.7 |
| 4,560,138 | 12/1985 | dePuglia et al. | 249/85 |
| 4,786,027 | 11/1988 | Stalter, Sr. | 425/125 |
| 4,847,030 | 7/1989 | Stalter | 249/56 |

Primary Examiner—Jay H. Woo
Assistant Examiner—Khanh Nguyen
Attorney, Agent, or Firm—Barnes, Kisselle, Raisch, et al

[57] ABSTRACT

Three-part vertical stack-up mold apparatus for molding a composite styled wheel wherein the middle mold part is metal disc and rim subassembly operable as metal street wheel when a pneumatic tire is mounted on said rim. The lower mold part has a mold cavity surface to define an ornamental configuration for the outboard face of a plastic body of the composite wheel. An upper mold part urges the wheel into sealing engagement with the lower mold part. The lower mold part includes cores adapted for individual registry with disc air vent openings so as to protrude therethrough into the mold cavity in the closed condition of the mold. The upper mold part includes an expansible lid seal juxtaposed in mold cavity sealing relation to the disc inboard face and the cores in the mold-closed condition. The lid seal is radially outwardly expansible in response to clamping pressure of the upper mold part against the middle mold part as resisted by lower mold part during mold closure to thereby radially outwardly enlarge the sealing engagement of the lid seal against the disc inboard surface in the mold-closed condition, and vice versa during mold opening. The lid seal includes an elastomer annular flexible seal and a rigid ring which resists radially inwardly deformation of the seal under the clamping pressure. The seal and ring have a wedge-like engagement to cause radially outwardly expansible flexure of the seal upon disc engagement during mold closure. The lower mold part is a lightweight base steel framework weldment, and a relatively thin deck part removably secured upon the base and having a generally uniform cross-sectional thickness.

10 Claims, 4 Drawing Sheets

APPARATUS FOR MOLDING COMPOSITE METAL-ELASTOMERIC WHEELS

FIELD OF THE INVENTION

This invention relates to vehicle wheels of the composite metal-elastomeric styled automotive-type with a three dimensional deeply contoured ornamental outboard face, and more particularly to molding apparatus for constructing such a wheel.

BACKGROUND OF THE INVENTION

In the late 1960's and early 1970's Motor Wheel Corporation of Lansing, Mich., assignee of applicant herein, as well as its then parent company, The Goodyear Tire & Rubber Company of Arkon, Ohio, developed and introduced an improved form of composite metal-elastomer styled wheel marketed under the registered trademark "POLYCAST". Such styled wheels provided an automotive type wheel in which metallic parts of simple, conventional configuration, for which manufacturing equipment was already available, are utilized as the basic structural components to thereby obtain a high strength standardized wheel construction at minimum cost. The aesthetically pleasing appearance was imparted to this standard steel backbone by a permanently adhered ornamental plastic body, either molded separately or in-situ as a homogeneous one-piece body or in the form of a plastic cover secured by an adhesive foam body to the outboard side of the wheel. This provided an improved anti-noise characteristic to the wheel and enabled the appearance of the wheel to be readily and economically varied to suit different customer's styling requirements without varying the basic structural components of the wheel. Additional benefits resided in the side impact cushioning to prevent damage to the wheel while retaining the high strength and impact resistance advantages of the time-proven conventional ductile steel wheel components. Wider variations in styling and contour configurations were also obtained than were possible in the previous deep drawn styled all-steel wheels.

Various embodiments of such "POLYCAST" wheels, as well as methods and apparatus for producing the same, are set forth in the following U.S. Patents and pending U.S. patent applications assigned to the assignee herein:

U.S. Pat. No. 3,669,501—6/1972—Derleth
U.S. Pat. No. 3,756,658—9/1973—Adams
U.S. Pat. No. 3,762,677—10/1973—Adams
U.S. Pat. No. 3,794,529—2/1974—Thompson
U.S. Pat. No. 3,815,200—6/1974—Adams
U.S. Pat. No. 3,918,762—11/1975—Hampshire
U.S. Pat. No. 3,935,291—1/1976—Jackson
U.S. Pat. No. 3,956,451—5/1976—Adams
U.S. Pat. No. 4,017,239—4/1977—O'Connell
U.S. Pat. No. 4,251,476—2/1981—Smith
U.S. Pat. No. 4,398,770—8/1983—Smith
U.S. Pat. No. 4,659,148—4/1987—Grill
U.S. Pat. No. 4,682,820—7/1987—Stalter
U.S. Pat. No. 4,786,027—11/1988—Stalter
U.S. Pat. No. 4,790,605—12/1988—Stalter
U.S. Pat. No. 4,847,030—7/1989—Stalter
U.S. Pat. No. 4,861,538—8/1989—Stalter Pending U.S. Applications Ser. No. 4,963,083—Filed: 10/90—Stalter et al.
Ser. No. 353,099—Filed: 3/1989—Post et al.
Ser. No. 345,427—Filed: 5/1989—Joseph et al.

Other prior art patents issued to unrelated parties and directed to various types of styled metal and plastic wheels include U.S. Pat. Nos. 3,823,982, 3,827,756, 3,894,775, 3,915,502, and 3,998,494 as well as British Patent No. 1,290,946 (1972) and German Offenlegungschrift No. 2,457,907 (6/1976).

In one embodiment of method and apparatus for the manufacture of such POLYCAST wheels, a portion of the mold comprises a conventional metal vehicle wheel having a drop center rim secured to a central disc or body having the usual bolt circle holes and a center aperture so that the disc can be mounted on an axle, drum or disc brake assembly. The metal wheel is employed in conjunction with an upper back-up clamp and lower mold part to define therewith a sealed cavity for molding and attaching a three-dimensional contoured plastic overlay, the overlay thus being molded in-situ and permanently attached to the outboard side of the wheel in the mold apparatus. Preferably, the wheel forms the upper surface of the mold cavity and a reaction mixture of a urethane elastomer liquid adhesive material is injected or poured into the mold to fill the cavity and contact the outboard surface of the wheel assembly. The urethane material solidifies to form a high density non-cellular elastomer body which permanently adheres to the outboard surface of the wheel subassembly. The plastic overlay may also be constructed from a lower density microcellular closed cell urethane elastomer adhesive material. The urethane material is allowed to solidify in the mold cavity and then the mold is opened so that the wheel with the overlay securely adhered to it may be removed from the mold. The overlay may then be painted or otherwise covered with a decorative coating to provide a finished metallic-appearing ornamental wheel. The urethane elastomer thus forms a plastic body having a three-dimensional contour which is permanently attached to the outboard side of the wheel to provide a decorative surface, and the elastomer overlay appears to be an integral portion of the metal wheel.

Current styling trends for automotive passenger car wheels have moved in the direction of a so-called "full-face" appearance for the outboard side of the wheel, in which the outboard face appears to have a disc or body which extends from the center of the outboard face radially all the way out to the outer peripheral edge of the rim retaining flange for the outboard tire bead. Current styling is also trending toward moving the wheel vent windows or openings radially outward closer to the outer perimenter of the outboard face of the wheel.

Within given limts, such "full-face" styling can be achieved in the aforementioned prior art "POLYCAST" wheels, as shown for example in the embodiment of FIG. 9 of the aforementioned U.S. Adams Pat. No. 3,762,677. However, this has required the use of a relatively thick cross-section in the outer peripheral portion of the urethane body covering the radially inner face of the rim and extending up to the outboard tire-bead-retaining flange of the rim, due to inherent limitations in the injection pouring, molding and de-molding of the urethane reaction mixture. This heavy or large thickness dimension of the urethane material at the outboard tire bead retaining flange of the rim in turn required specialized wheel weights, which also added to the cost and complexity of the wheel. On the other hand, if the urethane material were terminated short of the outboard tire bead retaining flange of the rim to provide a so-called "modified full-face" look so that standard wheel weights could be attached thereto in the usual manner, a separate trim ring was needed to complete the "full-face" styling effect. These compromises also added to the cost and complexity of the complete wheel. An example of use of such a trim ring and "POLYCAST" construction is shown in the Spisak U.S. Pat. No. 3,891,276.

It has also been difficult if not impossible to achieve a placement of wheel vent windows in the outboard face of the urethane body of the "POLYCAST" wheel disposed radially outwardly close to the outboard tire bead retaining flange of the wheel. This is particularly true if a large number of small vent openings and/or extreme shape effects were desired for styling purposes, such as in simulating certain "scoop-spoke" effects, due to the negative draft angles and other limitations involved in the urethane "POLYCAST" molding process and apparatus. Thus the practice hitherto in making vent windows in "POLYCAST" wheels has been to have the mold vent fingers (such as bosses 46 and/or pedestal portions 294 of the aforementioned U.S. Pat. No. 3,762,677) protrude upwardly from a lower mold part so as to penetrate the "windows" in the steel backbone or disc or the metal portion of the wheel to provide a brake ventilation air passage which extends completely through the wheel.

The aforementioned pending U.S. patent application Ser. No. 285,634, filed Dec. 16, 1988, overcomes some of these problems and provides an improved wheel construction and method apparatus for making the same in which a "full-face" styling of the urethane body in the aforementioned "POLYCAST" type wheel construction is obtained by improvements in peripheral venting of the mold cavity at the outboard rim flange and/or by a radially offset and axially overlapping or engaging inboard and outboard mold cores. These cores cooperate in the molding process to produce an annular row of outboard pockets disposed in the plastic overlay body in radially offset, axially overlapping relation with an annular row of inboard pockets which in turn register with vent openings in the disc to thereby provide air passages through the wheel for brake ventilation.

However, for certain "POLYCAST" wheel designs it would be desirable to also shift the vent openings in the steel wheel disc radially outwardly closer to the outer periphery of the disc to enable the use of the prior mold core protrusions in order to produce scoop effects or the like in the POLYCAST body in conjunction with body vent openings which extend in the non-offset or straight-through manner of certain previous POLYCAST designs such that the disc vent openings remain visible from the exterior of the wheel. However, shifting of the disc vent openings radially outwardly into the shoulder or corner of the steel disc section has not hitherto been possible because of the limitations of the seal construction carried by the upper mold part clamp which could not "reach" radially outwardly far enough to cover such radially outwardly displaced disc vent openings to seal the same during the molding process.

Another problem associated with prior POLYCAST mold apparatus construction has been the relatively heavy weight construction of the lower mold part and the handling difficulties involved with such lower mold parts. There has also been a continuing need to reduce the mold casting cost and to have more dimensionally consistent or uniform castings which form the outboard face of the mold cavity.

OBJECTS OF THE INVENTION

Accordingly, it is an object of the present invention to provide an improved mold apparatus construction which overcomes the aforementioned disc vent window relocation problems as well as the weight and handling difficulties hitherto encountered with the larger prior art "POLYCAST" molds such as those disclosed in the aforementioned listed "POLYCAST" Stalter U.S. Pat. No. 4,786,027 and the Adams U.S. Pat. No. 3,762,677.

Another object is to provide an improved mold apparatus of the above character which is economical in construction and reliable in operation, and which achieves the aforementioned objects with only minimal changes in the associated prior method and apparatus for making prior art wheels of this type.

BRIEF DESCRIPTION OF THE DRAWINGS

The present invention, together with additional objects as well as features and advantages thereof, will become apparent from the following detailed description and the appended claims taken in conjunction with the accompanying scaled drawings, wherein:

DETAILED DESCRIPTION OF THE INVENTION

Figure 1:
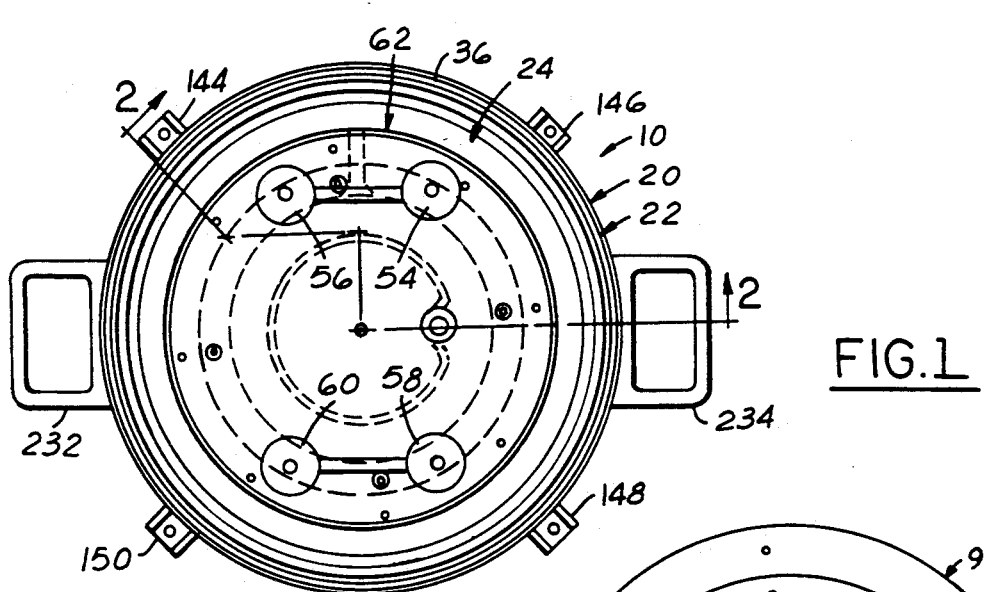
FIG. 1 is a top plan view of an improved mold apparatus construction of the invention.
Figure 2:
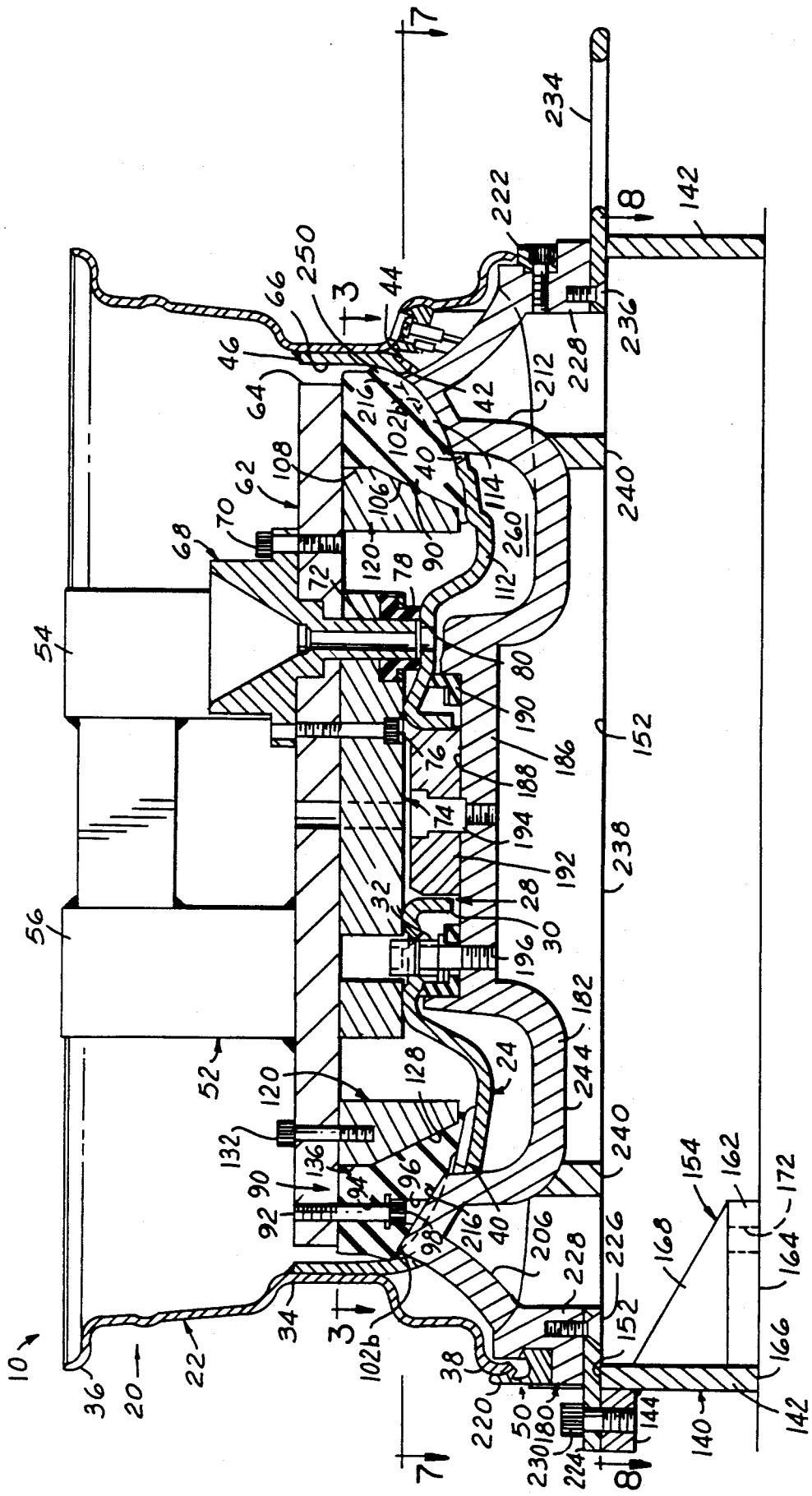
FIG. 2 is a vertical cross sectional view taken on the line 2—2 of FIG. 1 and illustrating the mold apparatus of the invention showing the upper and lower mold parts juxtaposed in closed mold assembly to the disc and rim subassembly and provided with a preferred embodiment of a disc inboard face seal and a two-part lower mold subassembly.

Referring in more detail to the accompanying drawings, FIGS. 1 through 9 illustrate an exemplary but preferred embodiment of the improved mold apparatus 10 of the invention, representing the best mode presently known for making and using the same for constructing a composite metal-elastomer styled wheel of the aforementioned type. As best seen in FIG. 2 (but also shown in FIG. 1), the wheel subassembly of mold apparatus 10 is generally designated at 20 and comprises a conventional drop-center steel rim 22, a central steel disc or body 24 permanently secured, as by welding, to the rim, prior to the molding operation. The finished "POLYCAST" wheel made by the apparatus of the invention will also include an ornamental three-dimensional contoured overlay (not shown) secured to the outboard face of disc 24 and to the outboard surface of rim 22. Disc 24 includes a central opening 28 defined by a draw neck flange 30, adapted to be received over a wheel hub, and a circumferential array of bolt openings 32 surrounding hub opening 28 and adapted to be received over the usual threaded lugs for mounting the completed wheel to a vehicle wheel hub or spindle and associated disc brake or drum brake assembly. Rim 22 includes a drop center well 34 and the usual axially spaced inboard and outboard tire bead retaining flanges 36 and 38 respectively for mounting thereon a typical tubeless pneumatic tire (not illustrated). The cross sectional contour and other details of rim 22 and disc 24 may be of any suitable configuration and do not per se form part of the present invention, unless otherwise specified hereinafter.

For decorative purposes and brake ventilation, a plurality of cut-outs or vent holes 40 are provided in disc 24 in the form of an equally angularly spaced annular array of holes. However, unlike prior "POLYCAST" steel disc constructions, vent holes 40 are disposed radially outwardly of the disc a greater distance from the wheel axis than hitherto deemed commercially feasible. In particular, the radially outermost portion 42 of the peripheral wall defining hole 40 is disposed in the so-called "shoulder radius" portion 44 of disc 24, close to the outer peripheral cylindrical flange portion 46 of disc 24 by which the disc is mounted to rim 22. As in the aforementioned prior art Adams patents, wheel subassembly 20 constitutes the middle mold part of mold apparatus 10, and the other two of the three main mold apparatus components comprise a lower mold part 50 defining the mold cavity surface for forming the decorative outboard face of the urethane overlay, and an upper mold part 52 which serves as a back-up support for clamping the middle mold part 20 onto lower mold part 50. However, in accordance with the present invention both the upper mold part 52 and the lower part 50 embody improvements in their constructional features over the prior art upper and lower mold parts which cooperate with middle part 20 as explained in more detail hereinafter to accomplish the aforestated objects of the invention.

Upper mold part 52 has two pairs of upright posts 54, 56, 58 and 60 (FIGS. 1 and 2) which are adapted to be fastened to a suitable molding press rm or fixture for raising and lowering of upper mold part 52, as will be well understood in the art. This apparatus is used to urge upper mold part 52 downwardly against wheel subassembly 20 as shown in FIGS. 1 and 2 to clamp mold 10 in its fully closed position.

Upper mold part 52 has a circular clamp plate 62 with a cylindrical outer periphery 64 with an outside diameter substantially less than the inside diameter of the inner cylindrical peripheral surface 66 of disc flange 46 such that, in the closed mold condition, a large radial clearance exists between surfaces 64 and 66 (FIG. 2). Posts 54–60 are welded to the upper surface of plate 62, and a steel funnel 68 is secured by bolts 70 onto the upper surface of plate 62. Funnel 68 has a coaxial neck 72 which extends downwardly through registering openings in plate 62 and in a central, circular abutment plate 74 affixed by bolts 76 to the underside of plate 62. The lower end of neck 72 extends into a washer seal 78 mounted in plate 74, the lower end face of neck 72 being disposed slightly above or in recessed relation to the lower end face of seal 78. Disc 24 is provided with a pour opening 80 between a pair of adjacent bolt holes 32 therein. Neck 72 of funnel 68 and washer seal 78 are positioned for coaxial registry with pour opening 80 in the closed mold condition.

Figure 3:
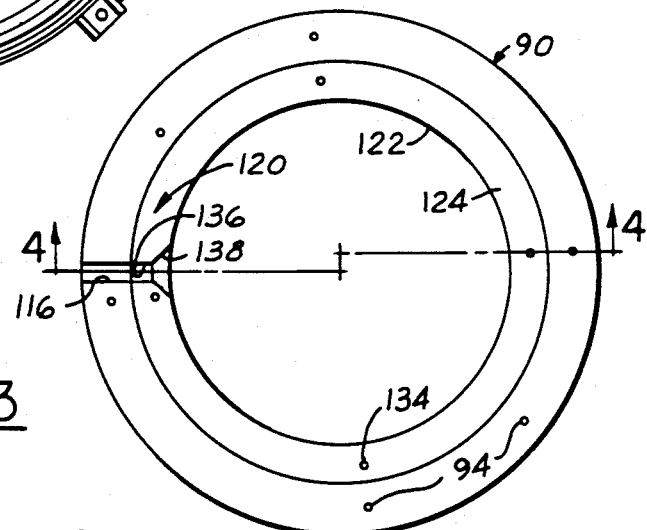
FIG. 3 is a top plan view of the improved disc vent window seal of the upper mold part shown by itself, the seal member being viewed as the same would appear as viewed on the section line 3—3 of FIG. 2.
Figure 4:
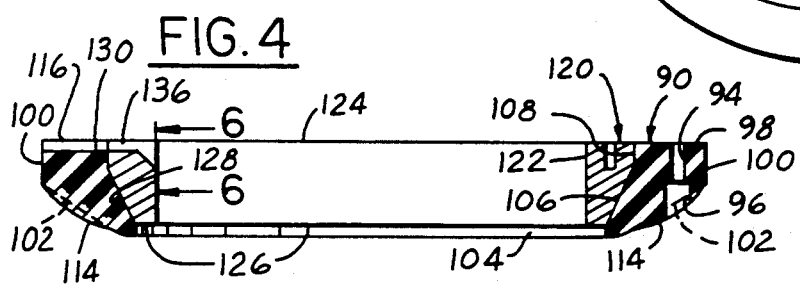
FIG. 4 is a vertical cross sectional view taken on the line 4—4 of FIG. 3.
Figure 5:
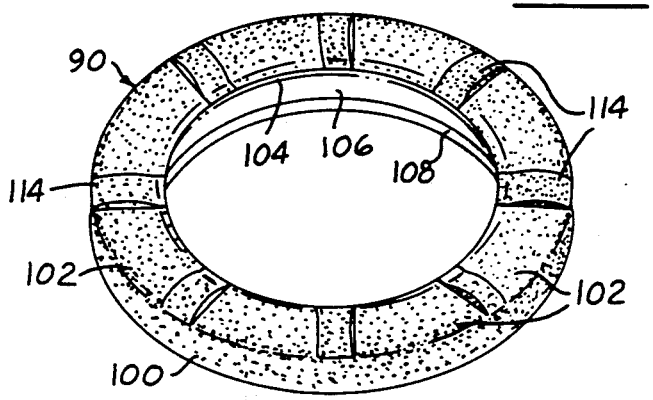
FIG. 5 is a perspective view of the upper mold part seal member shown inverted from its orientation in FIGS. 1-4.

In accordance with one important feature of the present invention, upper mold part 52 is provided with a two-piece annular expansible seal subassembly for sealing leakage of the liquid urethane reaction mixture from the mold cavity via the disc vent holes 40. As best seen in FIGS. 2–6, on part of this seal construction comprises a flexible, resilient annular member, preferably molded from silicone rubber, referred to as a lid seal 90, which is fastened to the under surface of plate 62 by eight studs 92 each inserted upwardly through an associated seal bore 94 and a counter bore 96 such that the stud head 97 is recessed and captured in counter bore 96 as shown in FIG. 2. As best seen in FIGS. 3–5, lid seal 90 has a flat upper surface 98, a cylindrical outer peripheral wall 100, a generally frusto-conical bottom wall 102 inclined radially inwardly of the wheel in an axially outboard direction and terminating at its radially inwardly edge in a narrow cylindrical inner peripheral wall 104. The inner periphery of ring seal 90 is further defined by a frusto-conical wall 106 extending from a junction with wall 104 radially outwardly in an axially inboard direction relative to the wheel to a junction with a cylindrical wall 108 which in turn extends upwardly (axially inboard) to a junction with the top surface 98 of lid seal 90.

Seal bottom wall 102 in its free state condition is generally complemental to the inner peripheral contour of disc 24 in an annular zone encompassing the inner periphery of shoulder 44, the disc vent windows 40 and the portion 110 of disc 24 between the windows 40 and the hat section 112 of disc 24. More particularly, in the illustrated embodiment of disc 24, there are eight windows 40 and hence the bottom wall 102 of seal 90 is provided with eight angularly spaced, axially outboard protruding pad portions 114 as best seen in the inverted perspective view of FIG. 5. Each pad 114 is adapted to sealably seat against the inboard surface of disc 24 circumferentially between an adjacent pair of disc vents 40. The radius of curvature of each pad 114 on its bottom surface juxtaposed between an associated pair of vent windows 40 is generally the same as or slightly less than that of the inboard surface of disc 24 against which pad 114 is to be abutted in the closed mold condition as shown in FIG. 2. The eight recessed portions 102b (FIG. 5) of seal bottom wall 102 disposed circumferentially between pads 114 are configured to individually sealably seat on surfaces 216 of an associated core boss 212 of an upper deck 180 as described in more detail hereinafter. Each recessed wall portion 102b has a dimension taken circumferentially of seal 90 greater than that of an associated registering disc window 40, and the length of its bottom surface taken radially of seal 90 is greater than, and is designed to overlap, the surfaces of disc 24 radially outwardly and inwardly of the associated disc vent window 40.

Figure 6:
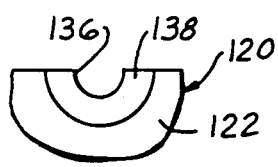
FIG. 6 is a fragmentary view taken on line 6—6 of FIG. 4 and enlarged thereover.

The upper surface 98 of lid seal 90 is also provided with a wax runner groove 116 extending radially through the inner and outer peripheral walls 108 and 100 of seal 90 FIGS. 3, 4 and 6.

Figure 9:
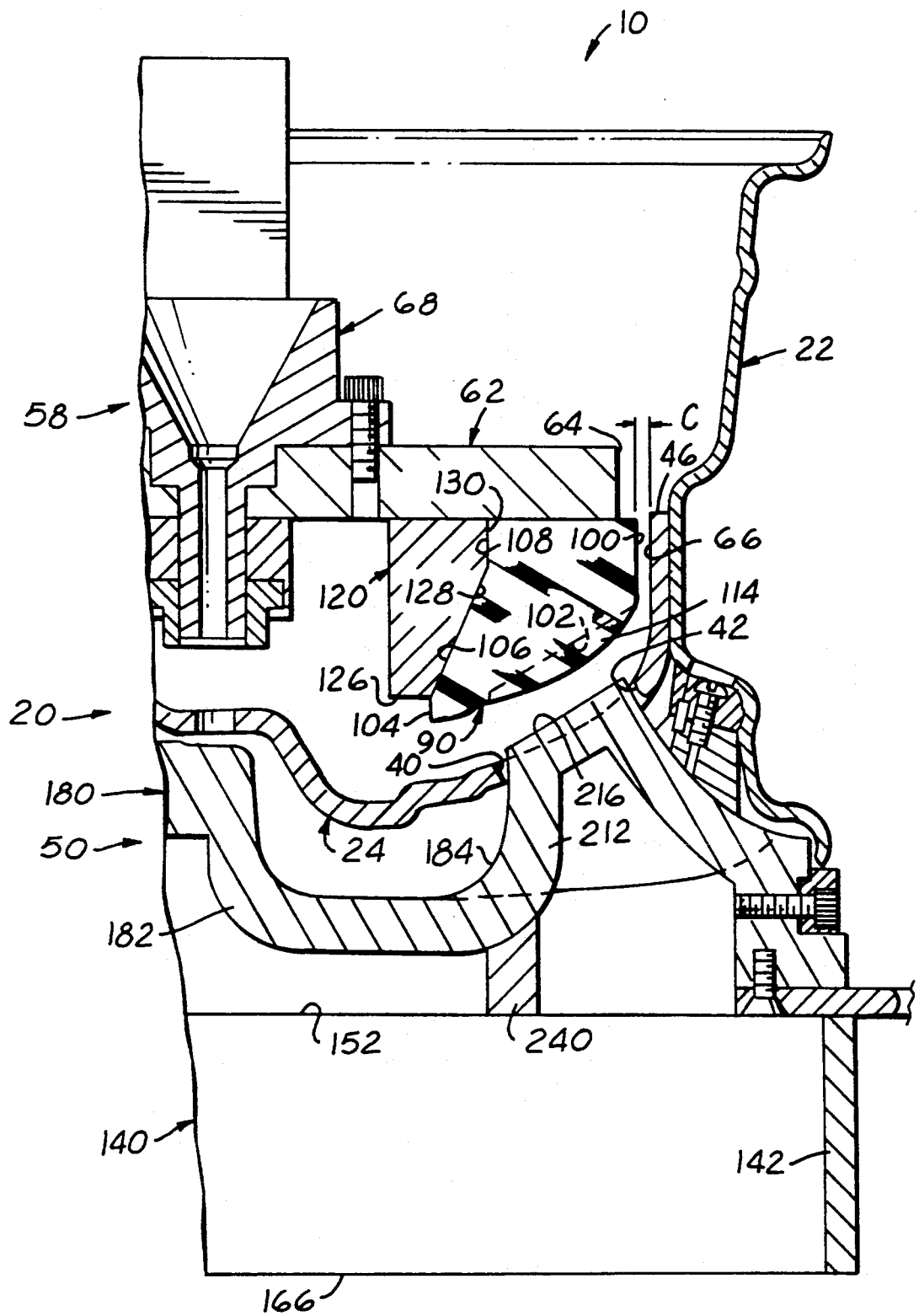
FIG. 9 is a fragmentary center sectional view of the right hand portion of the view of FIG. 2 but illustrating the upper mold part raised above and separated from sealing engagement with the disc of the disc and rim subassembly.

The improved expansible lid seal construction of the invention includes a second part, namely, a rigid wedge ring 120 made of aluminum or other rigid material such as fiberglass, magnesium, etc. for high strength and light weight. Ring 120 is preferably cast and machined to have a cylindrical interperipheral wall 122, radially-extending flat top and bottom walls 124 and 126 spaced apart by the distance between top surface 98 of seal 90 and the junction of seal surfaces 104 and 106 (FIG. 4) The outer peripheral surface of ring 120 is complemental to seal surface 106 and 108 and thus has a frusto conical surface 128 mating with seal surface 106 and a cylindrical surface 130 mating with seal surface 108 in the unstressed or free state condition of seal 90, as shown in FIGS. 4 and 9. Preferably, surface 128 has a cone angle of about 25° relative to the axis of ring 120, and surface 106 is likewise complementarily angulated. Ring 120 is removably fixed to the under surface of plate 62 by four studs 132 (FIG. 2) inserted into tapped holes 134 provided in ring 120. A wax runner groove 136 is provided in the upper surface 124 of ring 120 for registry with groove 116 of seal 90, and has a conical throat 138 leading to the inner peripheral surface 122 of ring 120 (FIGS. 3, 4 and 6).

As best seen in FIG. 9, when the upper mold part 52 is out of engagement with middle mold part 20 during the mold closing and mold opening sequence of operation of mold apparatus 10, seal 90 is in its free-state (uncompressed and unstressed) condition and in this condition the outer peripheal cylindrical surface 100 thereof is spaced by relatively large radial clearance dimension "C" from the inner peripheral surface 66 of disc flange 46. Indeed in this unstressed condition the vertical projection downwardly of seal surface 100 may be even slightly radially inset from the radially outermost peripheral wall portion 42 of disc window vent hole 40. The large clearance obviates any possible problem of interference between disc flange 46 and seal 90 during mold opening and mold closing motions despite the usual, relatively large tolerance variations which may be encountered sequentially from one wheel subassembly 20 to another in a mass-production molding operation, and the further tolerance stack up which may occur due to the fixturing tolerances of the three part mold apparatus 10.

In accordance with a further feature of the present invention, the lower mold part 50 comprises a two piece subassembly consisting of a ring-like mold base frame work 140 preferably made as a steel weldment. Base 140 consists of a cylindrical ring 142 made from steel strip stock having, for example a width of 2.50 inches, a thickness of 5/16 inches and an outer diameter of 18.8 inches. Ring 142 is provided with four equally angularly spaced ears 144, 146, 148, 150 (FIGS. 2, 7 and 8) affixed as by welding to the outer periphery of ring 142 so as to protrude radially outwardly therefrom flush with the upper edge surface 152 of ring 142. Base 140 also has four angularly spaced mounting brackets 154, 156, 158, 160 arranged in an angularly spaced relationship and affixed to the inner periphery of ring 142 so as to protrude radially inwardly therefrom. Each bracket 154 comprises a rectangular bottom plate 162 welded to inner periphery of ring 142 positioned so that its bottom surface 164 is flush with the bottom surface 166 of ring 142. A pair of triangular gussets 168 and 170 are welded to the upper surface of plate 162 and to the inner periphery of ring 142 to brace each bracket 154-160. Each bracket has a bolt hole 172 for receiving a bolt for fastening base 140 removably to a mold pallet assembly (not shown) to thereby simplify mold changes and set ups.

The upper part of the two piece lower mold subassembly 50 comprises the deck 180 which consists of a one piece casting 182 preferably made from beryllium-copper material cast against a suitable pattern so that the upper face 184 thereof defines the lower face of the mold cavity 260. The remaining surfaces of the mold cavity 260 are defined by the outboard face of disc 24 and the outboard portion of rim 22 juxtaposed to lower mold deck 180 in the mold-closed condition of mold apparatus 10. The upper face 184 of casting 182 is thus configured to define the outboard decorative face of the "POLYCAST" urethane body (not shown) which is molded against and adhered to disc 24 and rim 22 of wheel subassembly 20 in the molding process. As best seen in FIG. 2, casting 182 has a centrally disposed pedestal portion 186 having a cylindrical well 188 inset on its upper surface which receives a resilient seal ring gasket 190. Gasket 190 is adapted to seal the mold cavity around its inner perimeter in the fully closed condition of mold 10 with wheel subassembly 20 fully seated on lower mold part 50. A centering disc 192 is fixed by a threaded fastener 194 to well surface 188 coaxially so as to slidably fit within the draw neck flange 30 of disc 24 to assist in piloting wheel subassembly 20 onto the lower mold part 50. A locator pilot stud 196 threadably fastened to pedestal 186 is adapted to register with and protrude through one of the bolt holes 32 of disc 24 to angularly register wheel subassembly 20 on lower mold part 50.

For the particular "POLYCAST" wheel design illustrated by way of example herein, the outboard decorative face is to be provided with an aerodynamic scoop like effect with eight individual stream-lined tapering pockets individually registering with the disc vent windows 40. For the purpose casting 182 has eight contoured core bosses 200, 202, 204, 206, 208, 210, 212, and 214 (FIG. 7 and FIG. 2) which project axially upwardly from casting 182 in a direction inboard of wheel 20. Each boss 200–214 terminates in inclined flat surfaces 216 oriented to incline radially outwardly and axially inboard of wheel 20 complemental to surface 102 of seal 90 in its closed-mold position, wherein the bosses 200–214 individually protrude at their upper ends through the associated disc vent opening 40 with a relatively large radial clearance therebetween, as best seen in FIGS. 2 and 9. Preferably the boss end surfaces 216 are disposed axially inboard of the inboard surface of disc 24 in the area surrounding vent 40 by a distance of approximately ⅛ to ¼ inch.

Deck 180 of lower mold part 50 carries at its outer periphery a suitable vent seal 220 (FIG. 2) and associated rest blocks 222 as set forth in more detail in co-pending U.S. patent application Ser. No. 07/285,634, filed Dec. 16, 1988, assigned to the assignee of record herein and which is incorporated herein by reference. The outboard flange 38 of rim 22 is adapted to engage seal 220 and to be positioned thereon by blocks 222 for sealing the outer periphery of mold cavity 260 while venting the same to outside atmosphere to enable thin section urethane casting to be achieved in the vicinity of outboard flange 38.

Deck 180 is provided with a plurality (herein as shown as four) of equally annularly spaced flat mounting bracket plates 224 fastened by screws 226 to the underside of the annular peripheral mounting section 228 of casting 182. Plates 224 protrude radially outwardly from the outer periphery of casting 182 and are adapted to overlie and rest upon brace brackets 144 so that deck 180 may be detachably fastened to base 140 by associated mounting studs 230.

A pair of lifting handles 232 and 234 (FIGS. 1, 2 and 7) are detachably fastened by screws 236 at diametrically opposite locations to the undersurface of mold 10 peripheral section 228 and protrude radially outwardly from deck 180 a suitable distance for convenience in manual handling of this mold part. The bottom surface of handles 232 and 234 as well as bracket plates 224 are positioned flush with the lower edge 238 of mold casting 180, the lower surface of mold section 228 being suitable recessed to receive these parts to provide the edge-flush relationship.

In order to optimize the strength-to-weight ratio of mold casting 182, the same is made of relatively uniform sectional thickness of approximately one-half inch. If needed, a reinforcing ring section 240 may be suitably fashioned integrally with or affixed to the under surface 244 of mold casting 182.

In operation of the improved mold apparatus 10 of the invention, a wheel subassembly 20 is lowered onto lower mold part 50 to the seated position thereof shown in FIGS. 2 and 9. The upper mold part 52 is then lowered into wheel subassembly 20 by the fixturing mechanism attached to posts 54–60. One mechanism suitable for this purpose is shown in the aforementioned O'Connell et al U.S. Pat. No. 4,017,239 which is incorporated herein by reference. During the final downward motion of upper mold part 52 the same moves from the position shown in FIG. 9 to the position shown in FIG. 2. Until seal 90 reaches engagement with boss surfaces 216 of mold casting 182 and the circumferentially adjacent intervening surface areas of the inboard surface of disc 24, the same will have the free-state, unstressed configuration of seal 90 shown in FIGS. 4 and 9.

Once pads 114 of seal 90 engage these disc inboard surface areas, and the seal surfaces 102 engage the associated boss surfaces 216, the final closing motion exerted on upper mold part 52 to bring plate 62 to the position shown in FIG. 2 will compress seal 90 in a direction axially thereof. Due to the flexible, resilient material of seal 90, this will tend to cause the seal to bulge radially of the wheel. Radially inward displacement of the seal material, however, is prevented by the rigid ring 120. Hence, the flexing distortion of the seal produces a radially outward bulge thereof as indicated at 250 in FIG. 2.

In addition, the wedge-like engagement between ring surface 128 and the mating seal surface 106 and the ability of these surfaces to move relative to one another will tend to cam the material of seal 90 radially outwardly as surface 106 tends to slide axially outboard along ring surface 128 during the final closing motion. Once upper mold part 52 has been closed to its final position as shown in FIG. 2 it will be seen that seal 90 is fully compressed and distorted. In this condition of seal 90 its outboard face has a tight, firm, sealing engagement with the inboard surface of disc 24 which completely and securely overlaps, both radially and circumferentially, the marginal areas around each vent window 40 of disc 24. Surfaces 102 of seal 90 seal fit tightly onto surfaces 216 of the mold core protrusion 200–214 and pads 114 of seal 90 seal fit tightly against the circumferentially intervening inboard surface areas of disc 24. Mold 10 is then ready for the pressurized liquid injection pour of the urethane reaction mixture via funnel of 68, neck 72 and pour opening 80 into mold cavity 260 defined between the outboard face of disc 24 and rim 22 and the inboard surface of casting 182.

Once the urethane reaction mixture has cured sufficiently to permit demolding, upper mold part 52 is raised by its fixturing mechanism. As upper mold part 52 is initially lifted from wheel 20 the resilience of seal 90, as the same as relieved from its compression stress, will cause seal 90 to return to its free-state shape shown in FIG. 9 once the stress is completely released. As stress is relieved on seal 90, surface 106 will again slide downwardly and creep back to its free state condition shown in FIG. 9. Likewise, surface 104 of seal 90 will return from its compressed distorted or pinched condition shown in FIG. 2 to the relaxed configuration shown in FIG. 9. Thus, as the stress is being relieved, the outer peripheral surface 100 of seal 90 will again contract radially inwardly to its cylindrical configuration shown in FIG. 9, thereby opening up the wide clearance dimension C (FIG. 9) between seal 90 and the surrounding inner periphery 66 of disc flange 46. This again insures no interference between upper mold part 52 and disc 24 during the mold-clearing upward motion of part 52.

From the foregoing description, it will now be apparent that the improved mold apparatus 10 of the present invention amply satisfies the aforestated objects and provides many advantages over prior art "POLYCAST" mold apparatus constructions. The upper mold part expansible seal construction, comprising rigid ring 120 and cooperative flexible seal ring 90, insures that the outside diameter of outer periphery 100 of seal 90 is small enough to permit good clearance with inner periphery 66 of wheel disc flange 46 when top plate 62 is inserted downwardly during mold closing operation into seated position on the inboard face of disc 24 and core protrusions 200–214. Due to the rigid back up ring 120 and the mating relatively movable conical surfaces 106 and 128 of the seal and ring, downward pressure applied to top plate 62 will cause the aforementioned relative movement of the wedge ring and seal ring only near the end of the downstroke, but then will insure sufficient deformation of the flexible seal ring 90 so as to squeeze and push the same radially outwardly over the radially outer edge of the window vents 40. Seal 90 then sealably covers the entire margin of these vents on the inboard side of the disc even though these vents are displaced radially outwardly to an extreme position as compared to prior window vent locations in the wheel disc. Ample retraction clearance of the seal 90 with disc 24 is likewise assured because of the immediate contraction of seal 90 as squeeze pressure is released upon the same during initial upward mold-clearing movement.

Figure 7:
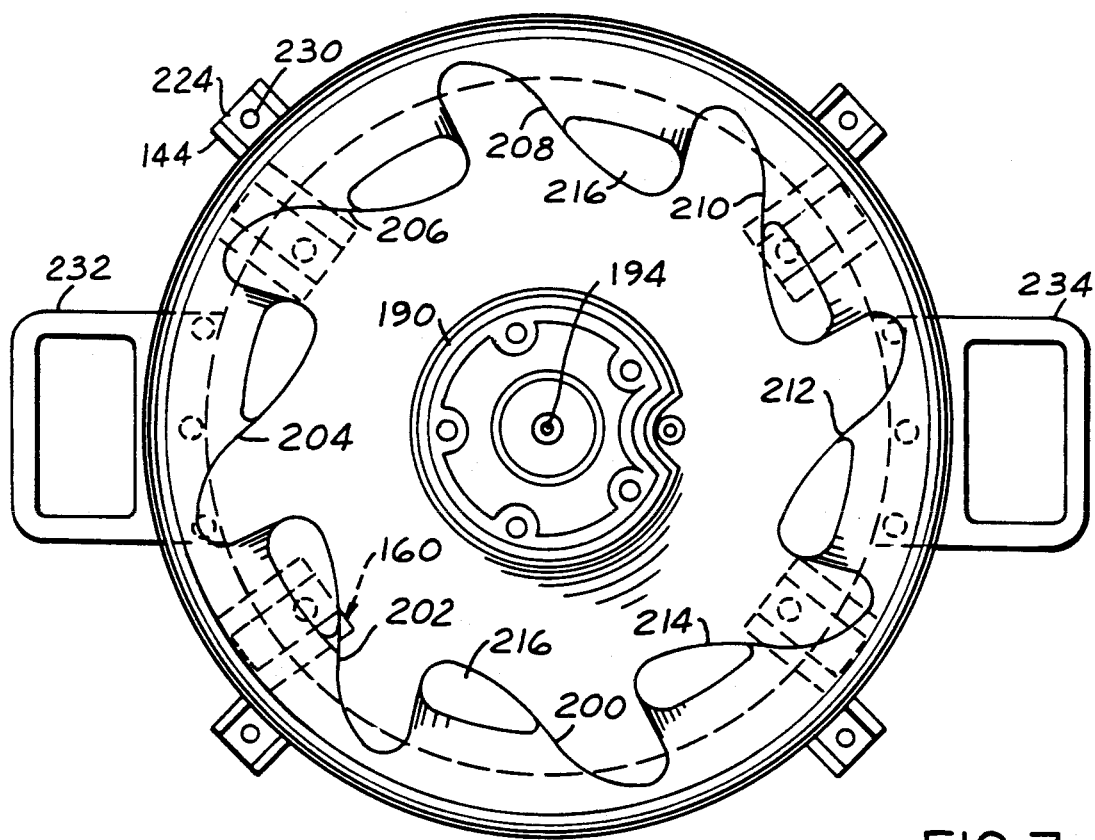
FIG. 7 is a top plan view of the lower mold part subassembly as viewed from the line 7—7 of FIG. 2 with the upper mold part and associated disc and rim subassembly removed from the mold.
Figure 8:
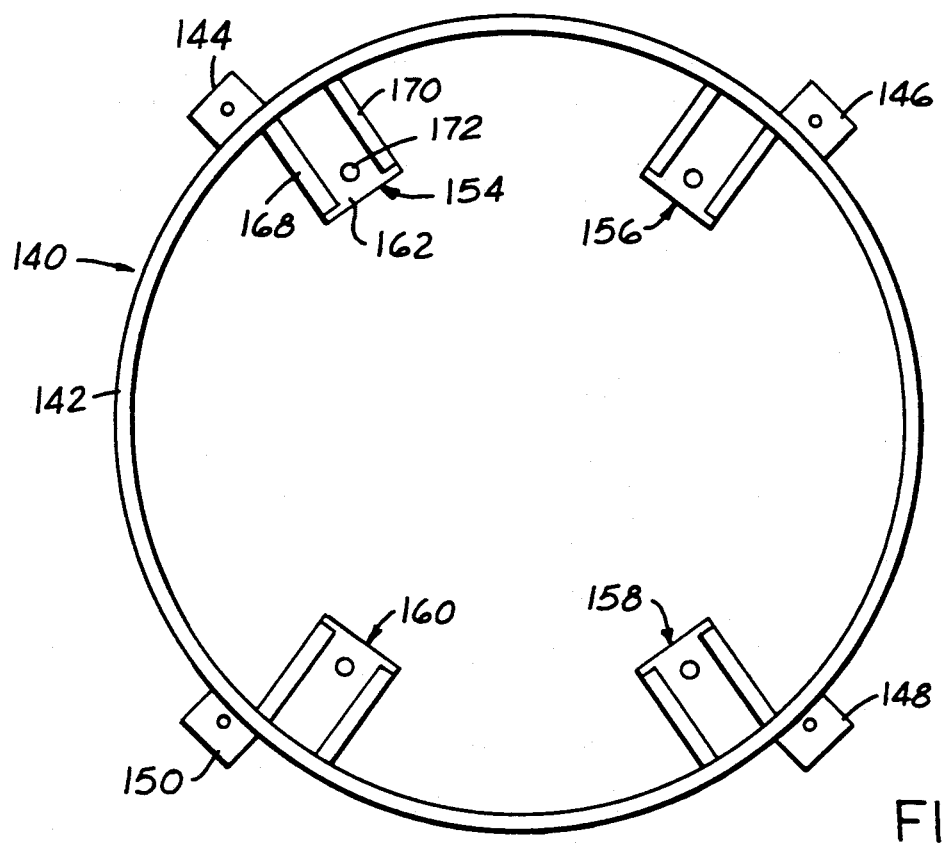
FIG. 8 is a top plan view of the lowermost part of the lower mold subassembly as viewed on the line 8—8 of FIG. 2 and shown by itself.

Lower mold part 50, because of its two-part construction, comprising base 140 and deck 180, greatly reduces the cost of construction of the entire lower mold part 50. By making the upper deck 180 as a relatively thin-section casting, and the lower section base 140 as a steel ring weldment, a substantial weight reduction is achieved. For example, a weight saving of 35 to 40 pounds has been obtained for a seventeen inch diameter wheel mold utilized to make a fifteen inch diameter "POLYCAST" wheel. In addition, more dimensionally consistent, uniform castings are obtainable following this construction feature. Moreover, base 140 may be standardized for different wheel configurations and may be left fastened to its associated mold pallet assembly (not shown). Removing deck 180 from base 140 is readily accomplished because of the detachable connection of these parts, thereby simplifying mold changes and set-ups. The two handles 232 and 234 provided on 180 aid in manually handling the same during mold set-up changes. If desired, handles 232 and 234 may be formed so as to extend radially outwardly from the mold flush with the plane of separation of parts 180 and 140 as shown in FIGS. 2 and 7, or these handles may be inclined upwardly at a 45° angle to further facilitate manual handling of deck 180. Thus the mold apparatus 10 of the present invention enhances production efficiency in terms of reduced apparatus cost and in reduced time and cost of production set-up changes as well as by reducing scrap rates.

Mold apparatus 10 also now enables the product of "POLYCAST" wheel designs having the aforementioned "full face" appearance but with disc vent window openings 40 displaced radially outwardly of the wheel to a greater extent than hitherto obtainable. Moreover, scoop openings in the urethane decorative body of the "POLYCAST" wheel construction can now be arranged by the designer at the extreme outer periphery of the wheel outboard face and yet be aligned and registered with the associated disc vent openings 40.

It is also to be understood that, although the foregoing description and drawings describe and illustrate in detail a successful working embodiment of the present invention, to those skilled in the art to which the present invention relates the present disclosure will suggest many modifications and constructions as well as widely different embodiments and applications without thereby departing from the spirit and scope of the invention. The present invention, therefore, is intended to be limited only by the scope of the appended claims and the applicable prior art.

I claim:

1. Apparatus for molding a composite styled metal and plastic vehicle wheel of the type having a metal disc and rim subassembly operable as a metal street wheel when a pneumatic tire is mounted on said rim and a decorative plastic body affixed and molded to a face surface of said wheel subassembly facing outboard of the vehicle on which said wheel is to be mounted, said metal wheel subassembly serving as a preform in said molding apparatus which is united with the plastic body molding material to form such composite wheel, said disc having a circular row of air venting openings therethrough, and said molding apparatus including a lower mold part having an annular lip disposed to be in sealing engagement against an annular portion of said metal wheel radially outwardly of the center of the disc in the closed condition of said mold apparatus, said lower mold part having a mold cavity surface to provide an ornamental configuration for an outboard face of said plastic body of the composite wheel, said mold cavity surface in said closed condition defining with at least part of such outboard face surface of said wheel subassembly, and an upper mold part comprising a clamp seating in said closed condition against an inboard face of said wheel subassembly urging the same into said sealing engagement with said lower mold part, said mold parts being axially separable from one another to open said mold apparatus and to clear said clamp from said wheel subassembly and said wheel subassembly from said lower mold part, the improvement wherein said lower mold part includes a plurality of outboard body vent-pocket-forming cores disposed in said mold cavity and adapted for individual registry with said disc vent openings so as to protrude therethrough from said mold cavity in the closed condition of said mold with a clearance space remaining between each of said cores and the associated disc vent opening, and said upper mold part includes expansible lid seal means in juxtaposed radially and axially overlapping relation to said disc inboard face and said cores in said mold-closed condition for sealing such core-disc part opening clearance spaces, said lid seal means being radially outwardly expansible in response to clamping pressure of said upper mold part against said wheel subassembly and in turn against said lower mold part duing mold closure to thereby raidally outwardly enlarge the mold cavity sealing engagement area of said lid seal means against the inboard surface of said disc in the mold-closed condition of said apparatus, and being radially inwardly contractible in response to release of such clamping pressure during mold opening, said lid seal means comprising a back-up part made of rigid material and a disc-engagement part made of heat resistant resilient material disposed in radially outwardly surrounding relation to said back-up part, said back-up and disc-engagement parts having axially overlapping juxtaposed engaged surfaces in a closed condition of said mold, said juxtaposed engaged surfaces of said lid seal means back-up and disc-engagement parts sloping radially inwardly in an outboard direction relative to the wheel to provide a wedge-like engagement between said back-up and disc engagement parts at said juxtaposed surfaces to cause radially outwardly expansible flexure of said disc-engagement part upon engagement thereof with said disc as said mold apparatus is closed.

2. The apparatus as set forth in claim 1 wherein said resilient disc-engagement part comprises a resilient annulus having fastener means recessed therein securing said resilient annulus at only one axial end thereof remote from said disc in the closed condition of said mold apparatus such that said annulus can flex and move bodily by deformation relative to said clamp and back-up part in a major portion thereof remote from said fastening means.

3. The apparatus as set forth in claim 1 wherein said juxtaposed engaged surfaces slope radially inwardly in an outboard direction at an angle of about 25° to the wheel axis in the closed condition of the mold.

4. The apparatus as set forth in claim 2 wherein said resilient annulus has a disc-engaging surface disposed so as to protrude in a direction axially of said annulus beyond an associated axially end face of said back-up part at least in the vicinity of said juxtaposed surfaces at an opposite axial end of said annulus remote from said one axial end of said annulus.

5. The apparatus as set forth in claim 4 wherein said disc engaging surface of said annulus is contoured to present circumferentially alternating portions recessed and protruding relative to one another axially of said annulus to respectively engage in mold-cavity sealing relationship with associated end faces of said core bosses protruding through said disc vent openings and the inboard surface areas of said disc disposed between said disc vent openings in the closed mold condition.

6. The apparatus as set forth in claim 1, 2, 3, 4, or 5 wherein said circular row of disc vent openings are disposed adjacent the outer periphery of said disc and extend into the radius of curvature of a shoulder area of said disc disposed adjacent an annular axially extending circumferential rim engagement flange of said disc, said disc-engagement part being adapted when radially outwardly expanded to overlie said disc inboard face and surround said disc openings and engage said disc flange in the closed condition of the mold, said disc-engagement part when released from mold clamping pressure being resiliently radially contractible to thereby disengage and clear said disc flange.

7. The apparatus as set forth in claim 1 wherein said lower mold part comprises a base frame work part and a deck part removably secured upon and juxtaposed over said base part, said deck part comprising a metal casting having an upper surface contoured to define said mold cavity surface and to define said outboard pocket core means, said deck part having a lower surface contour complimentary to said upper surface such that said deck casting has a generally uniform cross-sectional thickness generally throughout the same.

8. The apparatus as set forth in claim 7 wherein said base frame work part comprises a ribbon of flat steel stock coiled into a closed loop band having a diameter generally conforming to the outside diameter of said deck part, said deck part and said band each having mounting lugs secured respectively thereto and protruding radially outwardly of the outer periphery of the associated part and adapted to receive said fastener means for detachably securing said deck and base to one another, said base having internally disposed mounting brackets adapted for securing said base to a support pallet or the like.

9. The apparatus as set forth in claim 8 wherein said deck part is provided with a pair of diametrically opposed handles protruding radially outwardly of the outer periphery thereof to facilitate manual lifting of said deck part when detached from said base part to thereby facilitate mold change set ups.

10. The apparatus as set forth in claim 7 wherein deck part of said lower mold part is cast from beryllium-copper material and said base part constitutes a steel frame work weldment.

* * * * *